US009754398B1

(12) United States Patent
Cardwell et al.

(10) Patent No.: US 9,754,398 B1
(45) Date of Patent: Sep. 5, 2017

(54) ANIMATION CURVE REDUCTION FOR MOBILE APPLICATION USER INTERFACE OBJECTS

(71) Applicant: Amazon Technologies, Inc., Reno, NV (US)

(72) Inventors: Peter John Cardwell, Seattle, WA (US); Paul J. Furio, Seattle, WA (US); Richard Steven Harding, San Marcos, CA (US); Stephen Wallace Johnson, Seattle, WA (US); Valere Joseph Vanderschaegen, Mountlake Terrace, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 14/223,611

(22) Filed: Mar. 24, 2014

(51) Int. Cl.
*G06T 13/20* (2011.01)

(52) U.S. Cl.
CPC .................................. *G06T 13/20* (2013.01)

(58) Field of Classification Search
None
See application file for complete search history.

(56) References Cited

U.S. PATENT DOCUMENTS

| | | | |
|---|---|---|---|
| 2004/0109603 A1* | 6/2004 | Bitter | G06T 7/0083 382/154 |
| 2006/0026513 A1* | 2/2006 | Eschbach | H04N 1/33307 715/275 |
| 2014/0168253 A1* | 6/2014 | Arai | G09G 5/06 345/593 |

OTHER PUBLICATIONS

Lim, Ik Soo, and Daniel Thalmann. "Key-posture extraction out of human motion data." Engineering in Medicine and Biology Society, 2001. Proceedings of the 23rd Annual International Conference of the IEEE. vol. 2. IEEE, 2001.*

"Unity 3D: Animation Curves Explained", http://www.kwalee.com/2012/10/26/unity-3d-animation-curves-explained, published on Oct. 26, 2012, retrieved on May 24, 2016 from http://web.archive.org/web/20130609065251/http://www.kwalee.com/2012/10/26/unity-3d-animation-curves-explained.*

Nguyen, Van-Hanh, Frederic Merienne, and Jean-Luc Martinez. "An efficient approach for human motion data mining based on curves matching." International Conference on Computer Vision and Graphics. Springer Berlin Heidelberg, 2010.*

Kim, Ming-Hwa, Lap-Pui Chau, and Wan-Chi Siu. "Keyframe selection for motion capture using motion activity analysis." 2012 IEEE International Symposium on Circuits and Systems. IEEE, 2012.*

U.S. Appl. No. 13/965,126, filed Aug. 12, 2013, Amazon Technologies, Inc.

U.S. Appl. No. 14/035,897, filed Sep. 24, 2013, Amazon Technologies, Inc.

* cited by examiner

*Primary Examiner* — Zhengxi Liu
(74) *Attorney, Agent, or Firm* — Weaver Austin Villeneuve & Sampson LLP

(57) ABSTRACT

Techniques are described by which the data associated with a 3D animation may be reduced in a manner that does not result in perceptible visual artifacts when the animation is rendered on the display of a target device. Animation curve reduction is achieved by the removal of redundant animation curve samples, and is independently guided for different object attributes or animation channels by the nature of the attribute and one or more display parameters of the target device for which the animation is intended.

25 Claims, 12 Drawing Sheets

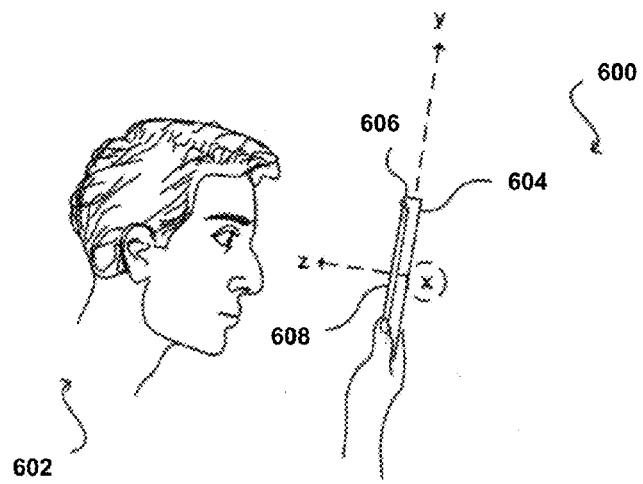
FIG. 6A
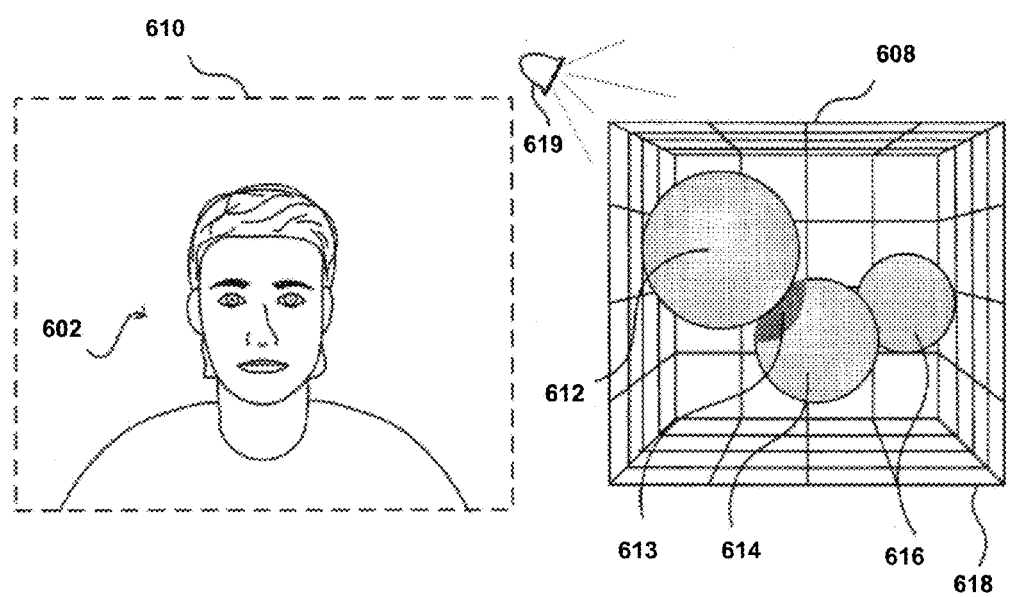
FIG. 6B  FIG. 6C

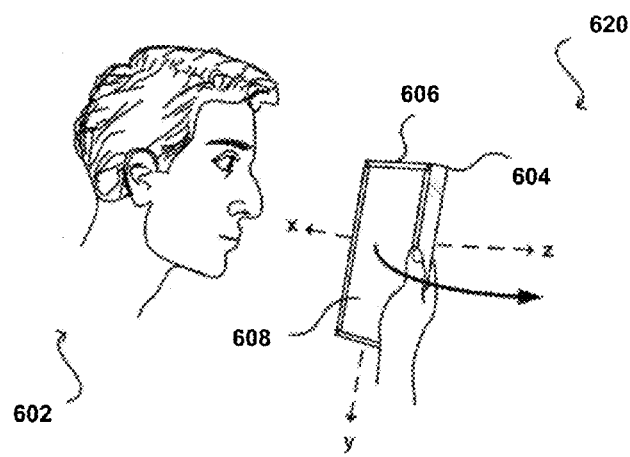
FIG. 6D
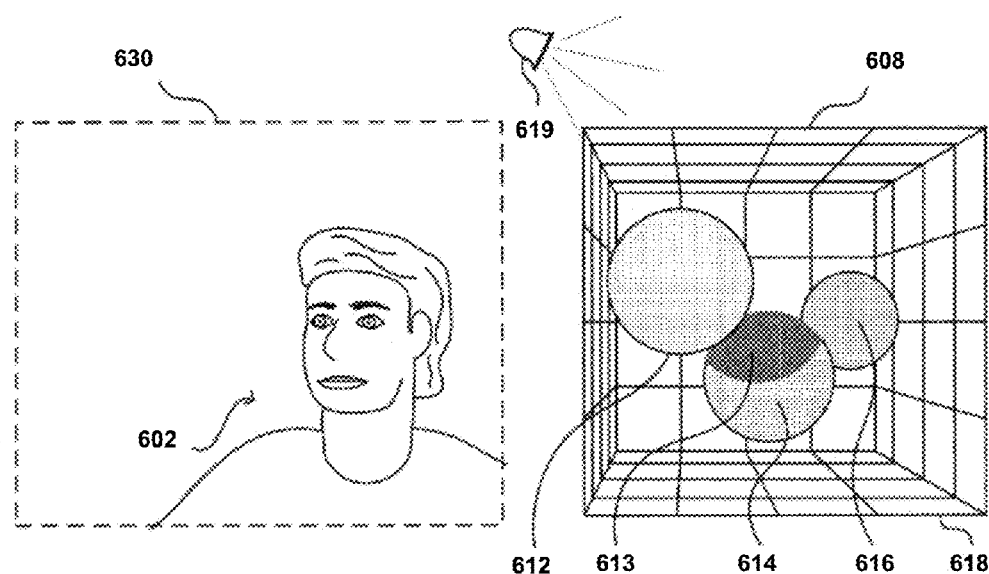
FIG. 6E  FIG. 6F

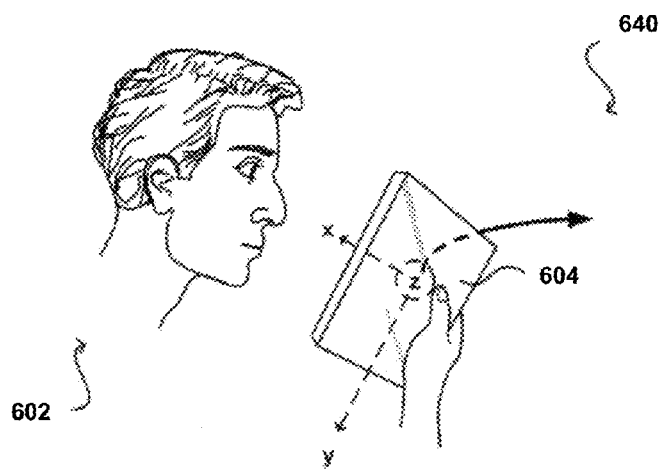
FIG. 6G
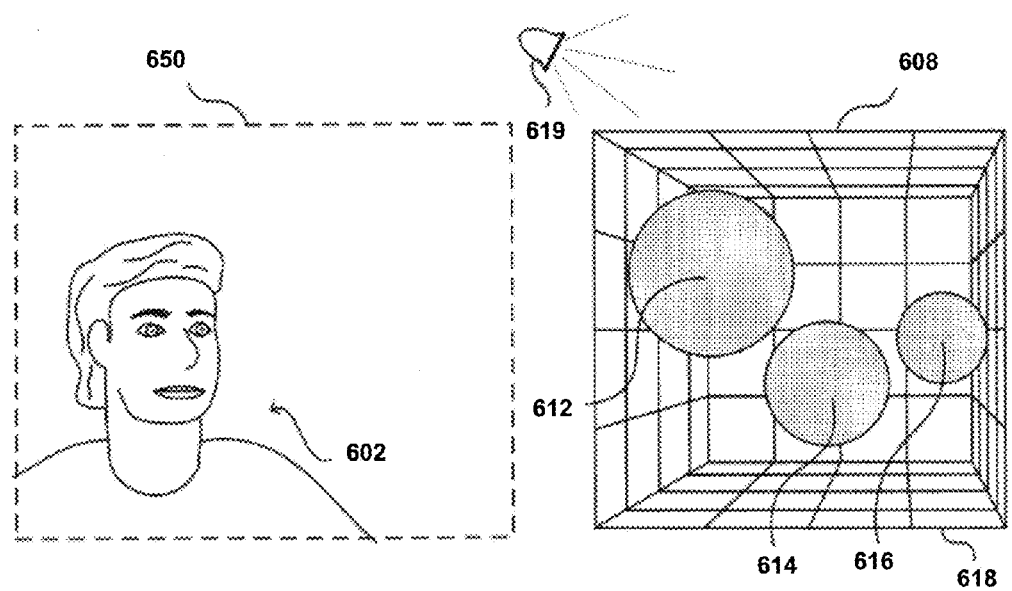
FIG. 6H
FIG. 6I

ANIMATION CURVE REDUCTION FOR MOBILE APPLICATION USER INTERFACE OBJECTS

BACKGROUND

User interfaces for mobile devices and mobile applications are becoming increasingly sophisticated. One of the primary obstacles to the use of complex animations in user interfaces for mobile devices and applications is the consumption of limited processing resources and power budgets associated with such devices. When an interface or application includes many such objects, the processing resources required can be prohibitive. Conventional techniques are inadequate to address this issue.

BRIEF DESCRIPTION OF THE DRAWINGS

FIGS. 6A-6I illustrate an example approach for providing a user interface that is based on tracking of a head or face of a user in accordance with an embodiment.

DETAILED DESCRIPTION

Figure 1:
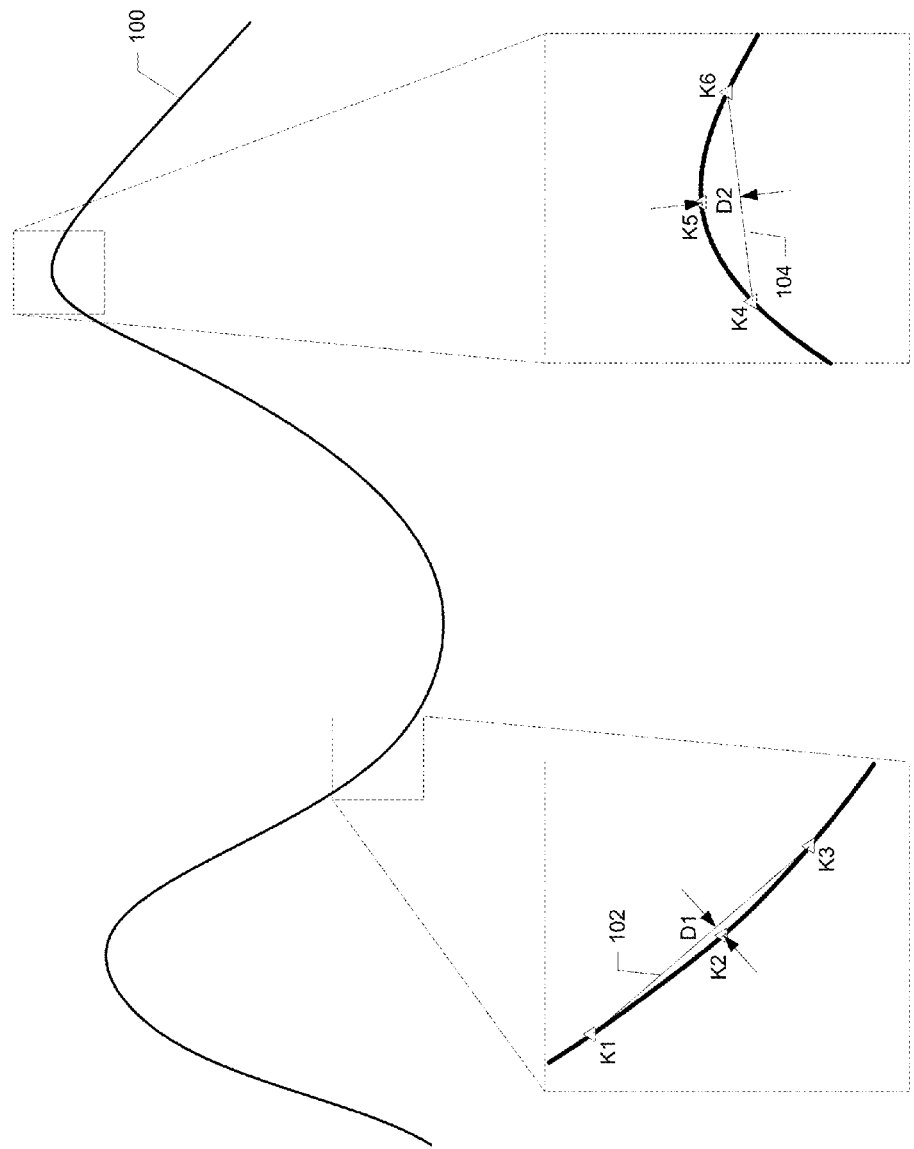
FIG. 1 is a diagram illustrating aspects of animation curve reduction according to a specific implementation.

This disclosure describes techniques by which the data associated with a 3D animation may be reduced in a manner that does not result in perceptible visual artifacts when the animation is rendered on the display of a target device. "Three-dimensional" or "3D" refers to any of a variety of animation types and computer-generated graphics that give an image on a two-dimensional display an apparent sense of depth and/or texture including, for example, animations and graphics created using 3D animation tools that rely on the 3D modeling and rendering of objects, "2.5D" or isometric techniques that employ two-dimensional graphical projections to simulate the appearance of a three-dimensional space, viewpoint-shifting animation that simulate or exploit parallax effects, etc. Other suitable techniques will become apparent to those of skill in the art with reference to the following description.

Animation of a 3D object may involve the use of a 3D authoring tool to specify a sequence of key frames for each of a number of attributes of an object that the animator wants to manipulate. These attributes and their associated key frame sequences are often referred to as animation channels and might correspond, for example, to characteristics such as movement along a particular axis, i.e., translation in one or more dimensions, rotation in one or more dimensions, scale or size, shape, color, etc. Each key frame in a given animation channel specifies an attribute value at a given point in time as well as a tangent setting that specifies a curvature leading to or leaving that key frame. Thus, the collection of key frames specifies an animation curve for that channel. The animation curve represents how the value of the object attribute for that channel changes over time. For example, for a translation attribute an animation curve might represent locations of an object along an axis in a virtual space over time. In another example relating to a color attribute, an animation curve might represent color, brightness, and/or shading values of an object over time. As will be understood, the number of run time samples of the animation curves required to render and display a relatively sophisticated animation of a single 3D object can be very large, requiring significant device resources to store and run the animation.

According to a particular class of implementations, animation curve reduction is achieved by the removal of redundant or otherwise expendable sampled values of the animation curve, and is independently guided for different object attributes or animation channels by the nature of the attribute and one or more display parameters of the target device for which the animation is intended. The value for each animation curve sample for a particular animation channel is compared to a value derived from an interpolation between adjacent or nearby sample values and, if it is within a programmable threshold amount of that value, it is deleted. Careful selection of the programmable threshold amount (also referred to herein as epsilon or $\epsilon$) for different animation channels results in a 3D animation that is more efficient to store and process, while enabling a faithful rendering of the animation as intended by its author. That is, when the animation is being rendered and displayed at run time, the device resources required to store and retrieve the animation curve samples for generation of video frames is reduced.

An example of animation curve 100 is illustrated in FIG. 1 which shows two example sequences of 3 consecutive animation curve samples, i.e., samples K1-K3 and K4-K6, respectively. In the first example, D1 represents the distance between the value of sample K2 and a segment 102 representing a linear interpolation between the values for the immediately preceding sample (K1) and the immediately subsequent sample (K3), e.g., an average of the two sample values. In the second example, D2 represents the distance between the value of sample K5 and a segment 104 representing a linear interpolation between the values for the immediately preceding sample (K4) and the immediately subsequent sample (K6). As can be seen, D2 is larger than D1 due to the fact that the portion of curve 500 between K1 and K3 is closer to a straight line than the portion of curve 500 between K4 and K6. As will be understood, appropriate selection of the value of $\epsilon$ for the depicted animation channel might result in sample K2 being removed and sample K5 being retained. It should also be understood that the interpolation value to which the sample value is compared may be derived by techniques other than a linear interpolation. For example, curves other than straight lines between the adjacent sample values might be used. In another example, the adjacent sample values might be weighted differently.

An example illustrating different animation channels for a particular user interface object may be instructive. As alluded to above, a user interface object (also often referred to as an "asset") has a sequence of key frames for each of a number of associated animation channels, that collectively specify the way in which a particular attribute or characteristic of the object changes over time. These may include channels representing translation, rotation, scale, shape, color, etc. Animation curve reduction for a particular object may be done for each channel and, depending on the nature of the various attributes, the approach for each channel may be customized to ensure that visual artifacts do not result from the reduction. For example, animation curve samples associated with translation of an object (i.e., movement along an axis) might be more readily discarded than those associated with rotation of the same object. This may be understood with reference to FIG. 2.

Figure 2A:
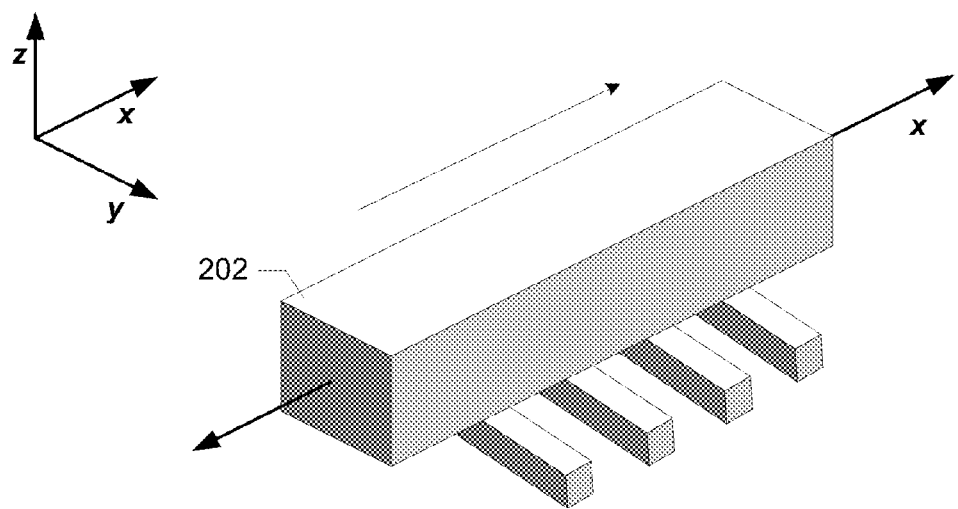
FIGS. 2A and 2B are illustrations of two animation channels of a user interface object.
Figure 2B:
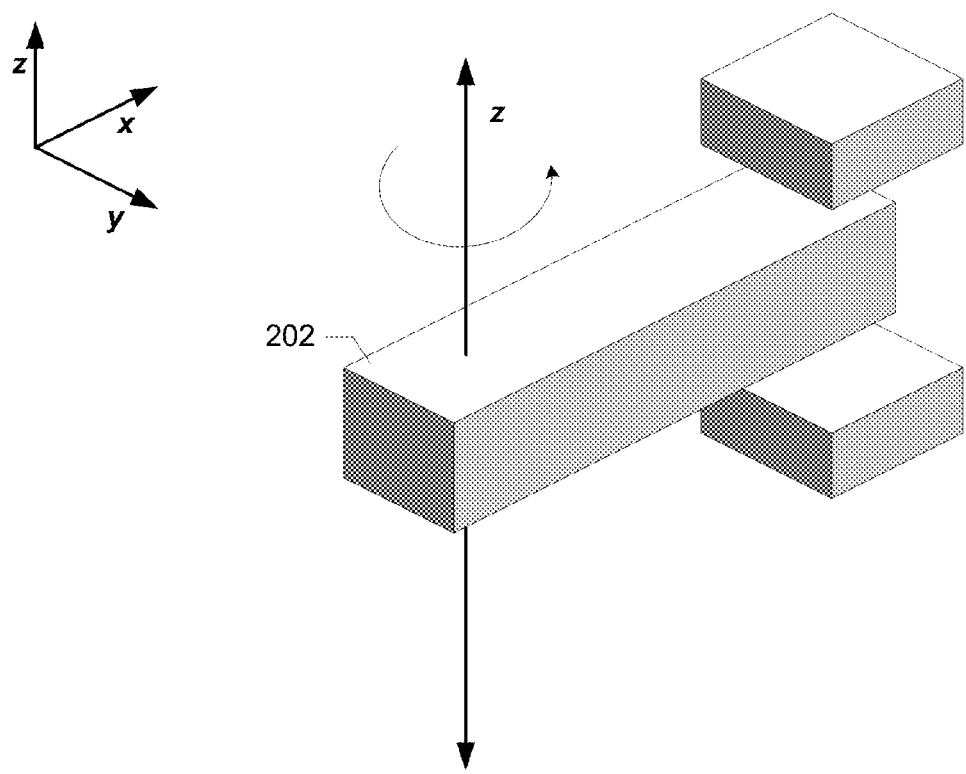

FIGS. 2A and 2B illustrate two different animation channels for a rectangular block 202; the first being a translation along an x-axis (FIG. 2A), and the second being a rotation about a z-axis (FIG. 2B). As will be understood by those of skill in the art, the translation of block 202 along the x-axis (as indicated by the arrow) may be completely specified using very few animation curve samples. This is particularly the case if the movement is characterized by a constant velocity, i.e., only samples corresponding to the starting and ending points of the animation curve representing the movement would need to be retained. By contrast, the rotational movement represented in FIG. 2B results in a difference in angular velocity as between the opposing ends of block 202 that might require keeping more animation curve samples than the simple translation example of FIG. 2A to ensure a smooth animation. Thus, due to the different natures of the attributes corresponding to these animation channels, different values of $\epsilon$ might be appropriate to guide the respective animation curve reductions.

Figure 3:
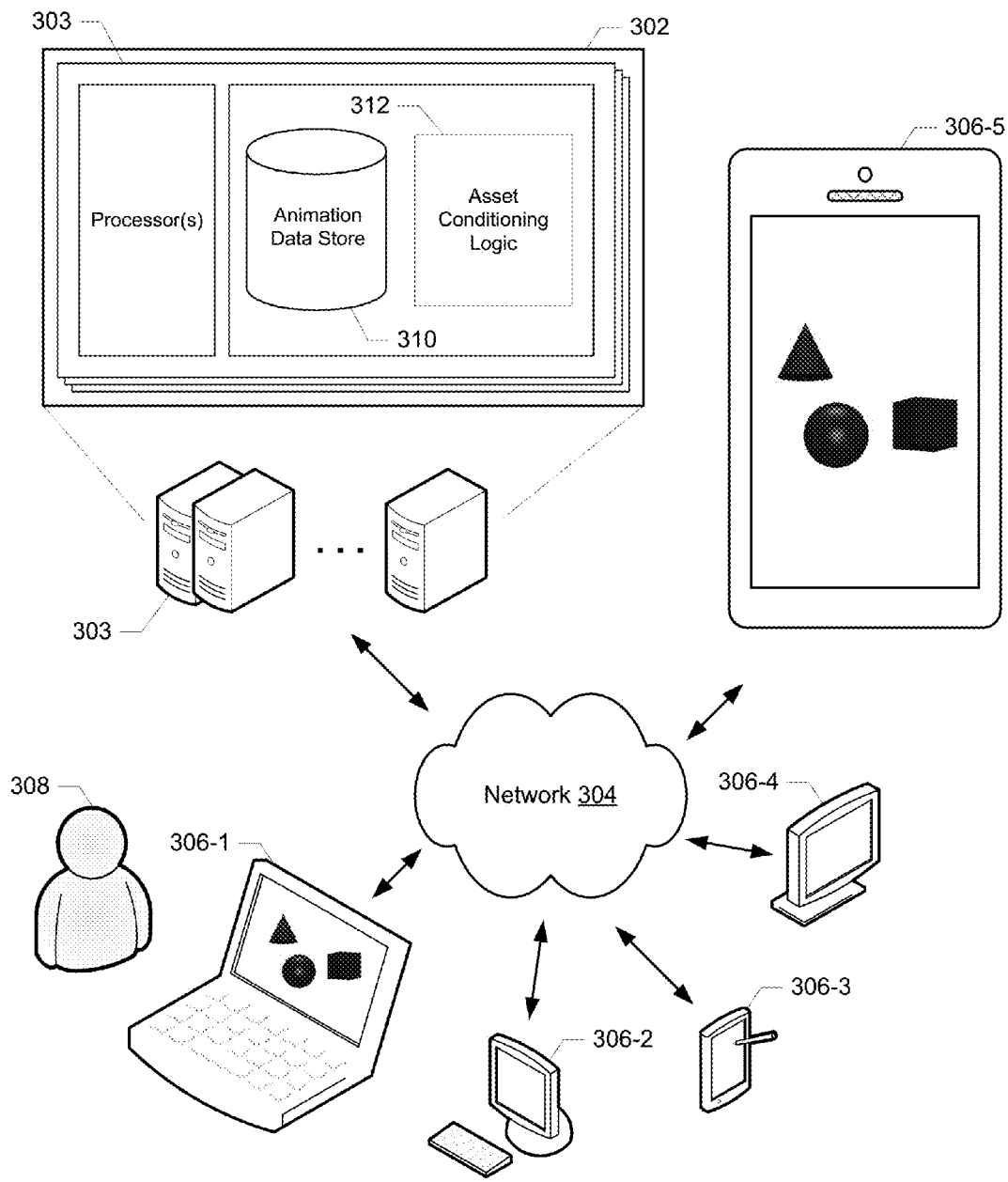
FIG. 3 is a simplified diagram of a computing environment in which implementations of the present invention may be practiced.

FIG. 3 illustrates an example of a computing environment in which an animator 308 creates animations and animations assets (e.g., using an animation authoring tool on laptop 306-1), the animation file(s) for which may then be uploaded to an animation deployment platform 302 via network 304, conditioned as described herein, and then deployed to target devices (e.g., device 306-5) for previewing or run-time execution. Platform 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Animation curve reduction techniques implemented as described herein may be adapted to condition animations and animation assets for any of a variety of device types (illustrated by devices 306-1 through 306-5). Such target devices may be any of a variety of suitable devices capable of connecting to network 304 and running user interfaces and applications provided by platform 302. Such devices may include, for example, mobile devices (e.g., cell phones, smart phones, and tablets), personal computers (e.g., laptops and desktops), set top boxes (e.g., for cable and satellite systems), smart televisions, gaming consoles, etc. Platform 302 includes a data store 310 in which the animation files uploaded by animators and delivered to target devices may be stored, and asset conditioning logic 312 which facilitates animation curve reduction as described herein.

It should be noted that the computer program instructions on which various implementations are based may correspond to any of a wide variety of programming languages, software tools and data formats, and be stored in any type of non-transitory computer-readable storage media or memory device(s), and may be executed according to a variety of computing models including, for example, on any kind of stand-alone computing device, or according to a client/server model, a peer-to-peer model, or a distributed computing model in which various functionalities may be effected or employed at different locations. For example, at least a portion of the code that enables animation curve reduction might be located on the animator's device (e.g., laptop 306-1) as a standalone application or as part of an animation authoring tool. Any suitable alternatives known to those of skill in the art may be employed.

Figure 4:
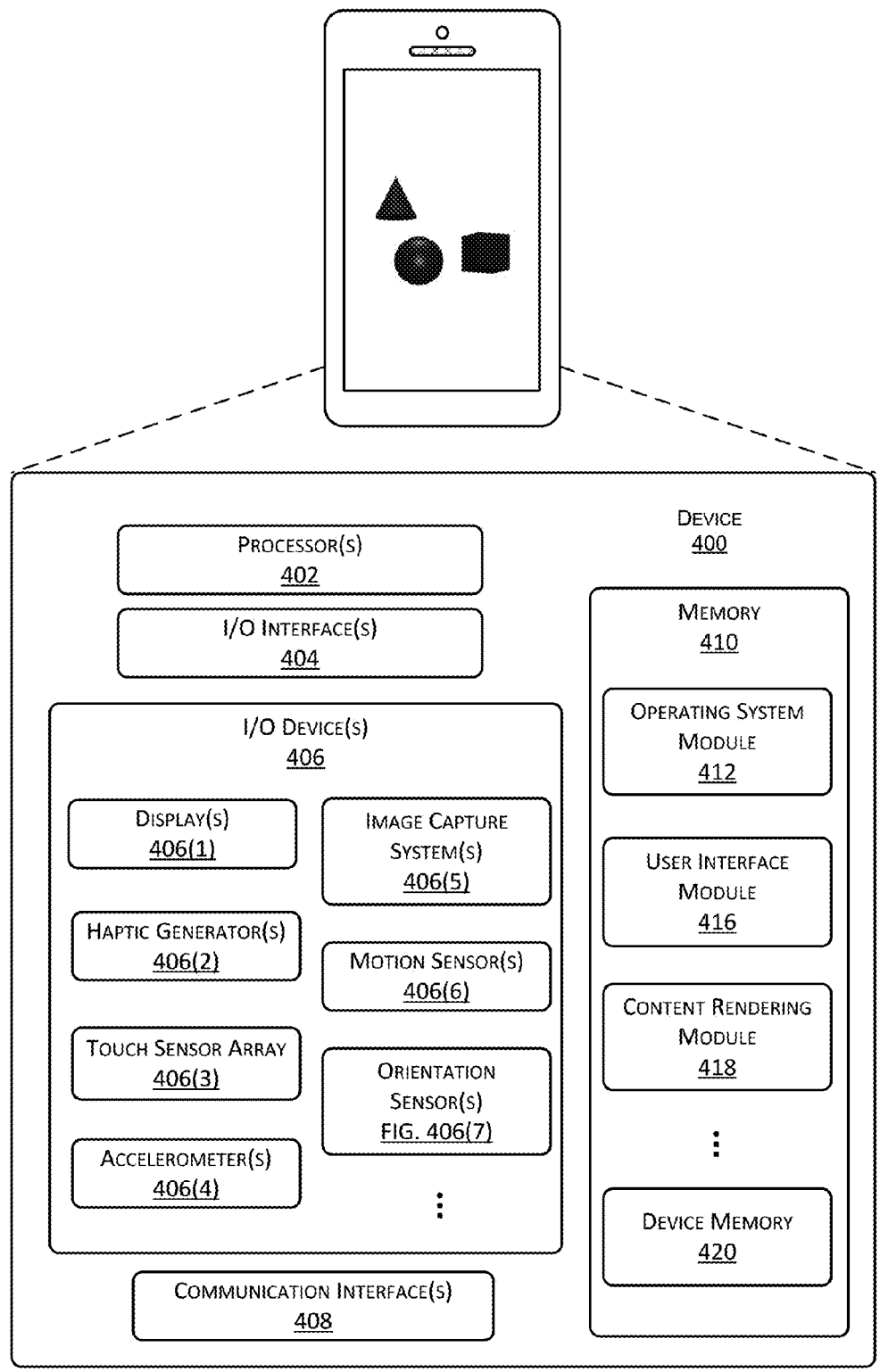
FIG. 4 is a simplified diagram of a mobile device configured to run an animation generated according to various implementations.

A block diagram of an example of a target device 400 suitable for previewing and running animations conditioned as described herein is shown in FIG. 4. Device 400 includes one or more single or multi-core processors 402 configured to execute stored instructions (e.g., in device memory 420). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth. The one or more displays 406(1) are configured to provide visual output to the user and may comprise any of a variety of display types including, for example, any type of reflective or transmissive display. Touch sensor array 406(3) may be a capacitive sensor array having a matrix of conductors that are scanned to determine, for example, the location, duration, speed and direction of touch events within the matrix based on changes in electrical capacitance.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules, applications, and other data for the operation of device 400. Memory 410 includes at least one operating system (OS) module 412 configured to manage hardware resources such as I/O interfaces 404 and provide various services to applications or modules executing on processor(s) 402. Memory 410 also includes a user interface module 416, a content rendering module 418, and other modules.

User interface module 416 is configured to present a user interface to the user that may include visual, audible, and/or haptic components. For example, user interface module 416 may be configured to present, in conjunction with content rendering module 418, a 3D user interface on display 406(1)

that includes user interface objects and animation assets conditioned as described herein. User interface module 416 may also be configured to process inputs of applied forces (e.g., touch events, swipes, etc.) at particular locations on the display to take particular actions such as, for example, navigating around a 3D interface, zooming in and out, panning, etc. User interface module 416 may also enable a user to interact with interfaces and applications using other types of input. For example, eye-tracking software (e.g., using input from image capture system 406(5)) might be used to navigate around an interface. Alternatively, sensors that detect spatial or inertial movement of the device, e.g., tilting or shaking, might be used (possibly in combination with other input) to navigate in a direction of a tilt or a shake of the device, or to manipulate an apparent perspective on a 3D interface. Such implementations might use input from, for example, accelerometer(s) 406(4), motion sensor(s) 406(6), and orientation sensor(s) 406(7). In another example, head-tracking software (e.g., using input from image capture system 406(5)) might also be used to manipulate an apparent perspective on a 3D interface. For example, a by detecting a change in the orientation of a user's head or face relative to the device's display, the user might be enabled to "look around" a UI object, i.e., an object previously obscured by another might be revealed.

Memory 410 also includes device memory 420 to store a wide variety of instructions and information using any of a variety of formats including, for example, flat files, databases, linked lists, trees, or other data structures. Such information includes animations for rendering and display on display 406(1). In some implementations, a portion of device memory 420 may be distributed across one or more other devices including servers, network attached storage devices, and so forth.

Figure 5:
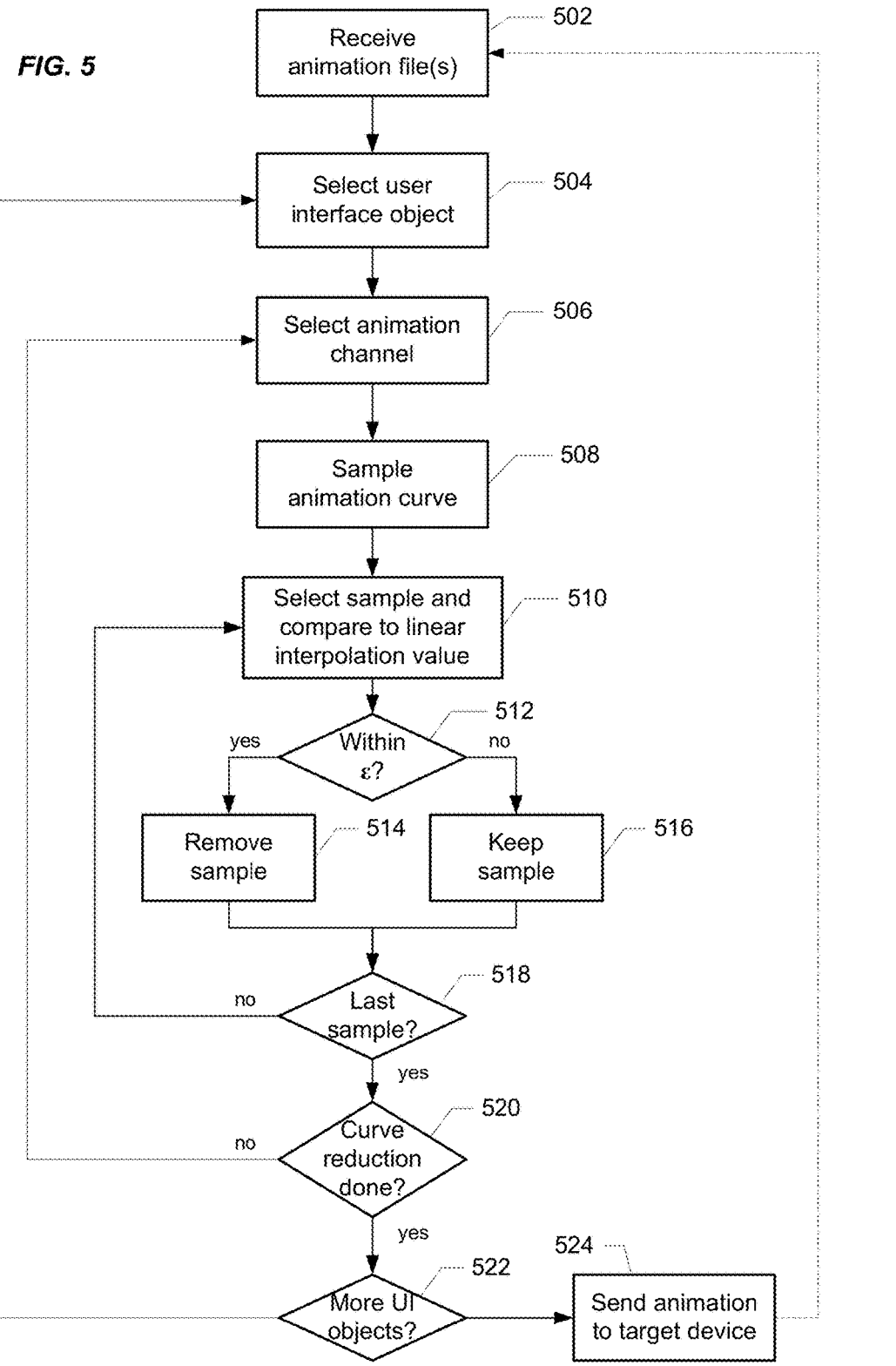
FIG. 5 is a flowchart illustrating operation of a specific implementation.

FIG. 5 is a flowchart illustrating animation curve reduction for user interface objects or assets associated with a 3D animation according to a particular implementation. The depicted implementation contemplates post-processing of an animation created by an animator (e.g., user 308) using any of a variety of 3D authoring tools (e.g., on device 306-1) such as, for example, Maya or 3DS Max from Autodesk, Inc., Moto Animation System from Qewerty, Cinema 4D from Maxon Computer GMBH, etc. The animator exports a fully or partially completed animation to a common data interchange format for uploading (e.g., to platform 302) and conditioning (e.g., by asset conditioning logic 312), including animation curve reduction as described herein. Suitable data interchange formats include XML and JSON, as well as other common 3D modeling file formats, e.g., Autodesk's FBX, OBJ developed by Wavefront Technologies, and Collada managed by the Khronos Group. The conditioned animation may then be deployed to the target device (e.g., device 306-5). This deployment may be the distribution of the application or interface to the end user, or may be part of an iterative process in which the animator can preview the animation on the target device for possible further development. According to a particular class of implementations, a custom set of plug-ins is associated with the 3D authoring tool that generates additional metadata in association with the export process that relate to how the 3D assets created in the authoring tool are used in the context of the target device.

Asset conditioning logic may perform a variety of functions in preparing 3D assets for run-time operation on target devices including animation curve reduction as described herein. For example, asset conditioning logic may convert 3D assets from the data format in which they are received to different standardized format or to a custom file format. The asset conditioning logic receives animation file(s) in the data interchange format that were uploaded from an animator's device (502). The animation file(s) represent a 3D animation that includes a number of user interface objects or assets. The file(s) include a sequence of key frames that specify an animation curve for each animation channel associated with each of the interface objects represented in the animation. The asset conditioning logic selects an interface object or asset (504) and one of the animation channels for the selected asset (506) and samples the animation curve for that channel at a sampling rate that is typically greater than or equal to the display frame rate of the target device (508), e.g., 30 frames per second for a typical handheld mobile device or smart phone. This results in a sequence of animation curve samples that represent values of the object attribute to which the current animation channel corresponds.

Each animation curve sample (not including the first and last samples which are kept) is compared to value derived from a linear interpolation between the immediately preceding sample and the immediately following sample (510). If the attribute value for that sample lies within a programmable amount $\epsilon$ of that linear interpolation value (512) it is considered redundant and is removed (514). Otherwise the sample is kept (516). This may be understood with reference to the example of an animation curve depicted in FIG. 5. It should again be noted that the interpolation value to which a sample value is compared may be derived using a technique other than a linear interpolation. It should also be noted that not every sample of the animation curve needs to be evaluated for deletion. For example, embodiments are contemplated which evaluate every other sample, every third sample, every fifth sample, etc.

According to a specific implementation, if an animation curve sample is removed, the next sample is compared to a segment between the sample before the sample that was removed and the following sample. For example, if sample 2 of a four sample sequence is removed because it is within $\epsilon$ of the segment between samples 1 and 3, sample 3 is evaluated with respect to a segment between samples 1 and 4 rather than samples 2 and 4.

As mentioned above, the $\epsilon$ for each animation channel may be independently specified so that the removal of animation curve samples for that channel does not result in visual artifacts in the animation that are perceptible to humans. According to a particular class of implementations, this is done with reference to the relationship between units for a given object attribute as specified in the 3D authoring tool and units of a display parameter of the target device. For example, the pixel size or density, or spatial resolution of the display of the target device can be used to determine how much of a deviation in position can be tolerated before it becomes visually perceptible on the display. The $\epsilon$ for translation-related channels can then be selected accordingly, e.g., $\epsilon$ can be chosen so that acceptable deviations caused by animation curve reduction fall within a pixel or less. In another example, the color resolution or grayscale capabilities of the display of the target device can be used to determine how much of a deviation in color, brightness, or shading can be tolerated before it becomes perceptible, and so on. Other examples will be apparent to those of skill in the art. It should be noted that the appropriate value for $\epsilon$ for a given animation channel may be empirically determined, at least in part, e.g., by varying $\epsilon$ and viewing the resulting object behavior for visual artifacts.

When the last animation curve sample for the currently selected animation channel is reached (518), the next animation channel for the currently selected asset is retrieved (506) and the process repeated until animation curve reduction for that asset is complete (520). The process is then repeated for each successive asset until animation curve reduction for all of the assets of the animation is complete (522). The example shown in FIG. 5 assumes a simple user interface object in order to clearly illustrate the depicted implementation. However, it should be noted that implementations involving more complex user interface objects are contemplated. Some user interface objects are complex structures that are often analogized to a "skeleton" that has a set of animation curves for each component of the structure, i.e., each "bone" in the skeleton. Each bone may interact with and/or relate to other bones in skeleton according to parent and child relationships defined by a component hierarchy. As will be understood, the animation curve reduction techniques described herein may be applied to each component of such an object.

The conditioned animation may then be transmitted to the target device as a "visual bundle," i.e., a package of binary assets (524), for rendering as a user interface or in connection with an application. The process may be iterated (dashed line) if the animator wishes to modify the animation once he has viewed it on the target device. It should be noted that animation curve reduction may be employed to animations associated with any kind of interface operating at any level of the target device, e.g., the home screen UI, any level of a multi-level UI, within applications, etc.). In addition, implementations are contemplated in which at least a portion of a conditioned animation may be stored remotely from the target device and, at run time, is dynamically downloaded and executed.

According to some implementations, animation curve reduction as described herein is transparent to the animator. That is, the animator may be entirely unaware that animation curve samples are being removed from his animation, with the ϵ's being specified at the back end so that the animator sees his animation faithfully rendered on the target device. However, it should be noted that implementations are contemplated in which the animator can be aware of and provide input to the animation curve reduction process to varying degrees.

One advantage associated with some implementations is the storage space required for storing an animation. That is, in some cases the reduction in the numbers of animation curve samples associated with an animation may be an order of magnitude or more. Another advantage may be that, at run time, much less data need to be evaluated to result in animation behavior that appears to be the same as the animation before animation curve reduction is applied. So, for example, if for a given animation it is known that for some time frame (e.g., between t1 and t2) there are only a very small number of samples necessary to run the animation, the samples can be cached rather than retrieved. Thus, by reducing the overall size of the animation, the amount of run-time processing and power required to run the animation may be correspondingly reduced.

As mentioned above, and according to various embodiments, animation curve reduction techniques described herein may be employed in implementing user interfaces that are based at least in part on a user's position with respect to a computing device and/or motion/orientation of the computing device. As will become apparent with reference to the following figures and description, the implementation of such interfaces may be advantageously supported by the efficiency represented by animation curve reduction with respect to the consumption of computing resources required to render and display such interfaces.

One or more user interface (UI) objects may be presented on a two-dimensional (2D) display screen, or other such display element (e.g., display(s) 406(1) of FIG. 4). One or more processes can be used to determine a relative position, direction, and/or viewing angle of the user. For example, head or face tracking (or tracking of a facial feature, such as a user's eyebrows, eyes, nose, mouth, etc.) and/or related information (e.g., motion and/or orientation of the computing device) can be utilized to determine the relative position of the user, and information about the relative position can be used to render one or more of the UI objects to correspond to the user's relative position. Such a rendering can give the impression that the UI objects are associated with various three-dimensional (3D) depths. Three-dimensional depth information can be used to render 2D or 3D objects such that the objects appear to move with respect to each other as if those objects were fixed in space, giving the user an impression that the objects are arranged in three-dimensional space. Three-dimensional depth can be contrasted to conventional systems that simulate 2D depth, such as by stacking or cascading 2D UI objects on top of one another or using a tab interface to switch between UI objects. Such approaches may not be capable of conveying as much information as a user interface capable of simulating 3D depth and/or may not provide as immersive an experience as a UI that simulates 3D depth.

Various embodiments enable UI objects to be displayed so as to appear to a user as if the UI objects correspond to 3D depth when the user's position changes, the computing device is moved, and/or the device's orientation is changed. The UI objects can include images, text, and interactive components such as buttons, scrollbars, and/or date selectors, among others. When it is determined that a user has moved with respect to the computing device, one or more UI objects can each be redrawn to provide an impression that the UI object is associated with 3D depth. Simulation of 3D depth can be further enhanced by integrating one or more virtual light sources for simulating shadow effects to cause one or more UI objects at depths closer to the user to cast shadows on one or more UI objects (or other graphical objects or content) at depths further away from the user. Various aspects of the shadows can be determined based at least in part on properties of the virtual light source(s), such as the color, intensity, direction of the light source and/or whether the light source is a directional light, point light, or spotlight. Further, shadows can also depend on the dimensions of various UI objects, such as the x-, y-, and z-coordinates of at least one vertex of the UI object, such as the top left corner of the UI object; the width and height of a planar UI object; the width, height, and depth for a rectangular cuboid UI object; or multiple vertices of a complex 3D UI object. When UI objects are rendered based on changes to the user's viewing angle with respect to the device, the shadows of UI objects can be recast based on the properties of the virtual light source(s) and the rendering of the UI objects at the user's new viewing angle.

In some embodiments, the 3D depths of one or more UI objects can be dynamically changed based on user interaction or other input received by a computing device. That is, when the 3D depth of a UI object changes, the UI object may cease to cast shadows on certain UI objects and/or cast new shadows on other UI objects. In still other embodiments, UI objects may be redrawn or rendered based on a change of the relative position of the user such that shadows cast by the redrawn UI objects must also be updated. In various embodiments, a UI framework can be enhanced to manage 3D depth of UI objects, including whether a UI object casts a shadow and/or whether shadows are cast on the UI object and the position, dimensions, color, intensity, blur amount, transparency level, among other parameters of the shadows. As will be understood, the processing and memory requirements for rendering and displaying these interactions among UI objects are great. It will also therefore be appreciated that the efficiencies represented by animation curve reduction as described herein are particularly advantageous in this context.

FIGS. 6A-6I illustrate an example approach for providing a user interface that is based on tracking of a head or face of a user in accordance with an embodiment. In the example situation 600 of FIG. 6A, a user 602 can be seen viewing a display screen 608 of a computing device 604. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 606 located on the front of the device and the on same surface as the display screen to capture image data of subject matter facing the front of the device, such as the user 602 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 606 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

As illustrated in FIG. 6B, when the user 602 positions the computing device in front of himself and gazes directly towards the display screen such that the x-y plane of the device is perpendicular or substantially perpendicular to the user's line of sight (where the lateral axis corresponds to the x-axis, the longitudinal axis corresponds to the y-axis, and the depth of the device corresponds to the z-axis), the image data captured by the front-facing camera of the device can include the image 610. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device. In this example, the device is capable of rendering one or more graphical elements for display on the two-dimensional display screen according to a viewing angle of the user with respect to the display screen. The device can rely on the position of the head or face of the user with respect to the device and/or the apparent motion of the user's head or face with respect to the device to draw or render one or more graphical elements on the display screen so as to simulate depth.

FIG. 6C illustrates an example of a user interface presented on the display screen 608 based on the user's viewing angle with respect to the device. The user interface includes three user interface objects 612, 614, and 616 displayed within a 3D grid 618. UI objects 612, 614, and 616 may be buttons for a user application that would normally appear to be the same size and shape to the user. However, here, UI objects 612, 614, and 616 have each been scaled to give the user the impression that the UI objects are associated with different depths. In particular, UI object 612 appears to be at a depth closest to the user and corresponds to a largest scale, UI object 614 appears to be positioned at an intermediate depth and corresponds to an intermediate scale, and UI object 616 appears to be at depth furthest away from the user and corresponds to the smallest scale. It will be appreciated that other transformations can also be applied to UI objects to simulate depth, including rotations, translations, perspective projections, among other transformations. It will also be appreciated that the storage and processing of the data required to render these UI objects may be made more efficient using the animation curve reduction techniques described herein.

To further enhance an impression that the user interface has depth, a virtual light source 619 may be positioned off-screen at the top left corner of a 3D grid-box 618. As mentioned, the shadows generated by a virtual light source can depend on the color, intensity, direction, position, and/or falloff function of the light source. Further, the light source can be modeled as a directional light, a point light, or a spotlight. A directional light is produced by a light source at an infinite distance from the scene and all of the rays emanating from the light source strike UI objects from a single parallel direction and with equal intensity everywhere. A point light, as in the example of FIG. 6C, is a light that gives off equal amounts of light in all directions. UI objects closer to the light may appear brighter than those further away. A spotlight is a light that radiates light in a cone with more light emanating from the center of the cone and gradually tapering off the further the away from the center. Modeling a light source based on one of a directional light, point light, or spotlight is known to those of ordinary skill in the art, and will not be discussed in detail herein. In some embodiments, the virtual light source may not be fixed as in the example of FIGS. 6C, 6F, and 6I. Instead, the virtual light source may be positioned with respect to a user and/or a computing device such that when the user and/or computing device move, the virtual light source also moves with the user and/or computing device.

In this example, virtual light source 619 is positioned such that UI object 612 casts a shadow 613 on UI object 614. UI object 614, on the other hand, does not cast a shadow on UI object 616 because UI object 616 appears at a y-position above UI object 614. Approaches for drawing or rendering shadows for UI objects are discussed in co-pending U.S. patent application Ser. No. 14/035,897, entitled "Generating Virtual Shadows for Displayable Elements," filed on Sep. 24, 2013, which is incorporated herein by reference.

In FIG. 6D, an example situation 620 illustrates that the user 602 has tilted the computing device 604 to the right with respect to the user, i.e., the user has rotated the device to his right along the longitudinal or y-axis. As seen in FIG. 6E, the tilt or rotation of the device causes the camera to capture a different view or perspective of the user within image 630, here, a three-quarters profile of the head or face of the user facing leftward. The position of the user's face may also be shifted towards a right region of the image 630 because of the rightward tilt or rotation of the device. In this example, the apparent motion of the face or head of the user (which may be primarily due to the motion of the device) can be tracked from the initial position detected in FIG. 6B to the new position depicted in FIG. 6E. Based on the apparent movement of the user's head or face, the user interface can be redrawn or rendered for display to correspond to the new viewing angle of the user 602. For example, as illustrated in FIG. 6F, when the user tilts the device rightward, the device will apply rotations, scales, translations, perspective projections, among other transformations, to objects 612, 614, 616, and 618 based on the new viewing angle of the user. In particular, 3D grid 618 has been skewed such that the right face of the grid appears more prominently in the display screen 608 while the left face of the grid is presented at more of an oblique angle when the user rotates the device laterally to the right. UI objects 612, 614, and 616 are also redrawn or rendered to correspond to the new viewing angle of the user with respect to the device. Further, shadow 613 has been recast to be consistent with the off-screen virtual light source 619 and the transformed UI objects 612 and 614 such that shadow 613 appears much larger in FIG. 6F than in FIG. 6C. Again, it will be appreciated that the efficiency represented by animation curve reduction supports these computationally intensive operations.

FIG. 6G illustrates an example situation 640 wherein the user 602 has tilted the computing device 604 to the left with respect to the user, i.e., the user has rotated the device to his left along the longitudinal or y-axis. As seen in the image 650 of FIG. 6H, the tilt or rotation of the device causes the camera to capture a three-quarters profile of the head or face of the user facing rightward, and the position of the user's face has also shifted towards a left region of the image 650. In this example, the apparent movement of the face or head of the user (which, again, may be primarily due to the movement of the device) can be tracked from the previous position depicted in FIG. 6E to the new position depicted in FIG. 6H. The UI objects 612, 614, 616, and 618 can be redrawn or rendered for display based on the apparent motion of the user's head or face as seen in FIG. 6I. For example, the user may be positioned as depicted in FIGS. 6D (and 6E) and may subsequently tilt the device laterally towards his left until the user's viewing angle is perpendicular or substantially perpendicular with respect to the device as depicted in FIGS. 6A (and 6B) (e.g., the user's initial position). The UI objects presented on the display screen 608 may be rendered or animated from what is seen in FIG. 6F to what is seen in FIG. 6C. In particular, the 3D grid 618 may be unskewed or otherwise transformed, UI objects 612, 614, and 616 may be rotated, translated, scaled, or otherwise transformed back to their original projections, and shadow 613 may be recast to correspond to the position of the virtual light source 619 and/or the original projections of UI objects 612 and 614. It will be appreciated that in various embodiments, interim user positions between when the user is positioned as seen in FIGS. 6D (and 6E) and when the user is positioned as seen in FIGS. 6A (and 6B) can be detected by the device. Interim transformations can be applied to the UI objects such that there may be a smooth animation effect for the transformation of the UI objects as seen in FIG. 6F to the UI objects as seen in FIG. 6C.

As the user continues rotating the device towards his left, the user interface may transform and/or be animated from the scene depicted in FIG. 6C to the scene depicted in FIG. 6I. In particular, the 3D grid 618 may be rendered such that the left face of the grid is presented more prominently and the right face of the grid is displayed at a more oblique angle, and UI objects 612, 614, and 616 may also be rotated, translated, scaled, or otherwise transformed in accordance with the new viewing angle of the user as seen in FIGS. 6G and 6H. In this example, the new viewing angle of the user causes UI objects 612, 614, and 616 to be rendered such that they no longer overlap. As a result, UI object 612 no longer casts a shadow on UI object 614. It will be appreciated that the head or face of the user can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the right and bottom faces of the 3D grid 618 may be displayed more prominently and the left and top faces may be displayed less prominently. When the user tilts the device forward and towards his left (i.e., such that the bottom right corner of the device is the closest point of the device to the user), the left and top faces of the grid can be displayed with greater detail, and the right and bottom faces may be presented with fewer details. Such an approach may give a user an impression that he is interacting with the UI objects in an environment having 3D depth.

In addition, or alternatively, a computing device can include one or more motion and/or orientation determination components, such as an accelerometer, gyroscope, magnetometer, or a combination thereof, that can be used to determine the position and/or orientation of the device. In some embodiments, the device can be configured to monitor for a change in position and/or orientation of the device using the motion and/or orientation determination components. Upon detecting a change in position and/orientation of the device exceeding a specified threshold, the UI objects presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone. These various approaches—image-based head tracking of the user, motion/orientation sensor-based monitoring of the device, or a combined approach—are discussed in co-pending U.S. patent application Ser. No. 13/965,126, entitled, "Robust User Detection and Tracking," filed Aug. 12, 2013, which is incorporated herein by reference.

In addition to monitoring a viewing angle of the user and/or motion/orientation of a computing device to draw or render a user interface based on changes to the viewing angle of the user and/or motion/orientation of the device, approaches in accordance with various embodiments also enable the depths of UI objects to be modified dynamically and UI objects to be redrawn or rendered appropriately with such modifications. Thus, a user application may be adapted to cause the depth of certain UI objects to be changed based on how a user interacts with the application and/or the application otherwise receiving other input.

Figure 7A:
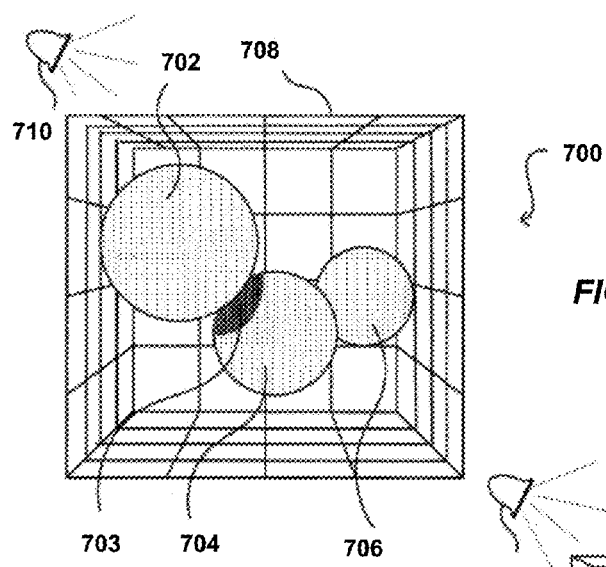
FIGS. 7A-7C illustrate an example approach for dynamically updating simulated depth for user interface objects in accordance with an embodiment.
Figure 7B:
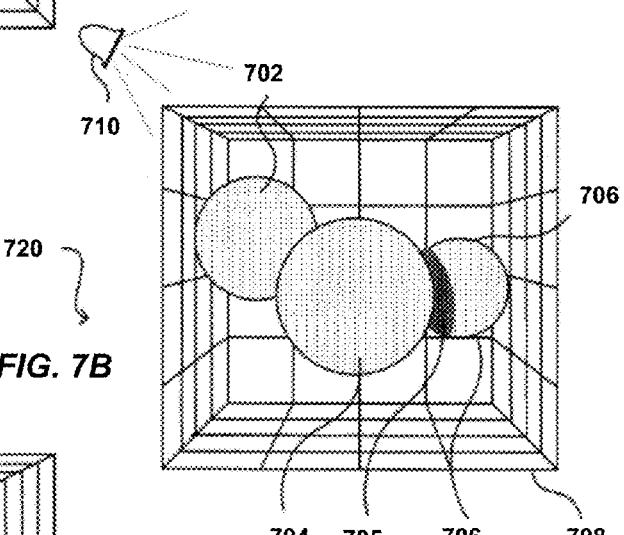
Figure 7C:
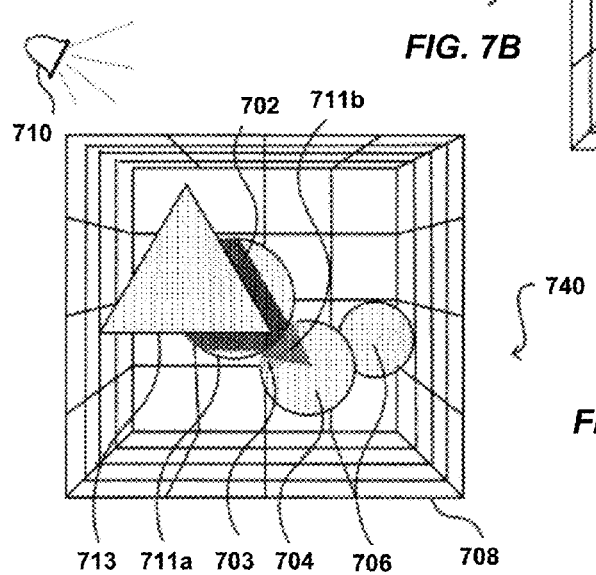

FIGS. 7A-7C illustrate an example approach of dynamically modifying the depths of UI objects in accordance with an embodiment. In FIG. 7A, an example 700 of a user interface similar to that of FIGS. 6C, 6F, and 6I is shown. The user interface includes three UI objects 702, 704, and 706 displayed within a 3D grid 708. Each of the UI objects 702, 704, 706 would normally appear to be similar in size and shape but have been transformed according to at least a scale to give a user an impression of depth. In particular, UI object 702 corresponds to a depth closest to the user and a largest scale, UI object 704 corresponds to an intermediate depth and an intermediate scale, and UI object 706 corresponds to depth furthest away from the user and a smallest scale. As mentioned, other transformations can also be applied to simulate 3D depth, such as rotations, translations, perspective projections, among other possibilities. In this example, UI object 702 can be seen overlapping an upper left portion of UI object 704, and UI object 704 can be seen overlapping a lower left portion of UI object 706. A fixed virtual light source 710 may be positioned off-screen at the upper left corner of the grid 708 such that UI object 702 casts a shadow 703 upon UI object 704. However, UI object 704 does not cast a shadow on UI object 706 because UI object 704 is positioned lower horizontally than UI object 706.

FIG. 7B illustrates an example 720 of the user interface after the user has interacted with the UI or the UI has otherwise received other input to change the state of each UI object. For instance, the UI objects could correspond to a portion of an alphanumeric keypad that uses depth cues for suggesting the most likely next key for the user to enter. After the user enters a portion of a text or a number, the device may present the next alphanumeric or numeric key corresponding to a text suggestion or number suggestion that the user is most likely attempting to enter into the computing device. The device can emphasize the next key by displaying the key at a depth closest to the user, and the device can de-emphasize other keys by positioning the other keys at depths further away from the user. Thus, in this example, UI object 704 is brought to a depth closest to the user and UI object 702 is pushed down to a lower depth. This is shown by the scale of UI object 704 being increased to the largest scale and the scale of UI object 702 being decreased to an intermediate scale. To further enhance an impression of depth of the UI, the transformations of UI objects 702 and 704 also result in UI object 704 casting a shadow 705 on UI object 706, and UI object 702 no longer casting a shadow on UI object 704.

FIG. 7C illustrates an example 740 of the user interface after the user has interacted with the UI or the UI has otherwise received other input to change the state of the UI. In this example, UI objects 702, 704, and 706 may represent components of one or more first executing user applications. The user may start up a second user application that includes UI object 713. The second user application may then obtain focus as depicted in UI object 713 being displayed at the depth perceived to be closest to the user. UI object 702, 704, and 706 can be pushed to a lower depth, which can be depicted by scaling the objects to a smaller scale and diffusing the intensity of shadows at lower depths. For example, the shadow 711a cast by UI object 713 on UI object 702 appears darker than the shadow 703 cast by UI object 702 on UI object 704 because of the relative depths of UI objects 702, 704, and 713. In this example, UI object 713 may also cast a shadow 711b on UI object 704, but at a different offset, shadow-casting angle, and/or intensity than the shadow cast on UI object 702 because of the differences in the depths of UI objects 713, 702, and 704. In particular, shadow 711b can be seen at a different offset and angle from shadow 711a, and shadow 711b is slightly darker than shadow 703. In some embodiments, the merger of shadows, can also cause the merged portion to appear more intense than it would otherwise if the shadows do not merge.

In various embodiments, a UI framework can be enhanced to manage 3D depths of each of the UI objects of the framework via a 3D layout container or 3D depth manager. The 3D depth manager may be associated with a virtual light source having properties as discussed elsewhere herein that can be configured by a user. In at least some embodiments, the 3D depth manager can also be adapted to be associated with multiple light sources by a device or a user of the device. Further, the 3D depth manager can be responsible for managing shadows of UI objects and optimizing drawing or rendering of the shadows. For example, a UI object that is to cast a shadow and/or receive a shadow can enable such functionality by registering itself with the 3D depth manager. The 3D depth manager can maintain state information for each depth that includes the position and dimensions of the UI objects at the depth and shadows that may be cast at that depth. When a UI object registers with the 3D depth manager, the 3D depth of the UI object can be obtained. If the UI object's 3D depth is not associated with any existing state information, the state information can be updated with the new depth and the position and dimensions of the UI object at the new depth. In some embodiments, the position and dimensions of a UI object may be defined by a rectangular area at the depth that bounds the UI object. The 3D depth manager can determine whether any UI objects at higher depths can cast shadows at the new depth and update the state information with the new shadows for the new depth accordingly. The 3D depth manager may also remove shadow pairings that may no longer be applicable as a result of introducing the new depth. Further, the 3D depth manager may determine whether the UI object can cast shadows on any UI objects at lower depths and likewise update the state information for the lower depths. In some embodiments, the position and dimensions of a shadow can depend on the position and dimensions of a corresponding UI object (e.g., "shadow caster") and the properties of the virtual light source(s). For example, the position and dimensions of the shadow can include an x-y offset from the shadow casting UI object, a depth of the shadow-casting UI object, and the position and dimensions of other UI objects (e.g., "shadow receivers"). In one embodiment, the dimensions of the shadow (e.g., width and height) can be similar or substantially similar to the dimensions of the corresponding shadow-casting UI object. In some embodiments, the shadows may depend upon the opacity of the shadow-casting UI object. For example, a UI object may comprise text and the shadow cast by such a UI object would only include portions of the UI object that are opaque.

In various embodiments, the 3D depth manager may use one or more k-dimensional (k-d) trees, binary space partitioning (BSP) trees, quadtrees, octrees, or variations thereof for quickly determining any collisions between UI objects and shadows at each depth. That is, these various algorithms can be used to determine where a shadow intersects with a UI object (e.g., where the shadow overlays the shadow receiving UI object). For instance, a quadtree is a data structure that can be used to represent a 2D region, such as a 2D region corresponding to a 2D display screen or other display element. The quadtree is formed by iteratively decomposing a region into four equal quadrants such that each leaf node contains data corresponding to a specific sub-region. A quadtree with a depth of n may be used to represent an image consisting of $2^n \times 2^n$ pixels. A quadtree begins with a root node that can represent the entire 2D region. As objects, such as UI objects, are added to the quadtree, a node will be split into four nodes and each object (e.g., UI object) can be inserted into one of the sub-nodes according to where it lies in 2D space. Quadtrees can be used to quickly detect collisions by determining whether a first object (e.g., UI object) intersects with another object (e.g., UI object). That is, a determination can be made whether the boundaries of the first object overlap with the boundaries of a second object. In one embodiment, a 3D depth manager can maintain a pair of quadtrees, one for UI objects and another for shadows, for each distinct depth of a user interface. If a first portion of a first UI object is covered by a second portion of a second UI object or shadow, the first portion does not need to be redrawn or rendered. Such an approach can be used to optimize rendering by reducing or minimizing overdrawing of portions of first UI objects and/or shadows that may be positioned beneath second UI objects and/or shadows at depths above the first UI objects and/or shadows.

Octrees may function similarly to quadtrees except that each node of an octree has exactly eight children or zero children (e.g., leaf nodes) and can be used to represent 3D space. A BSP tree is a generalization of quadtrees and octrees, but one in which the hyperplanes that partition space may have any orientation rather than being axis-aligned. BSP trees can be used to contain more complexly bound objects (e.g., UI objects), such as polygons. A k-d tree is a special case of a BSP tree in which every node is a k-dimensional point. Every non-leaf node generates a splitting hyper plane that divides space into two parts or half-spaces. Points to the left of the hyperplane can be represented by the left subtree and points right of the hyperplane can be represented by the right subtree.

The 3D depth manager can also manage state information when a UI object changes depth. The 3D depth manager can remove the UI object at its previous depth, update the position and dimensions of the UI object at its new depth, update or remove the shadows previously cast by the UI object, update or remove shadows previously received by the UI object, update or add shadows that are cast by the UI object at depths below the new depth, and add shadows received to the UI object at depths above the new depth. As mentioned, one or more k-d trees, BSP trees, quadtrees, octrees can be used to quickly facilitate collision detection (e.g., intersection or overlap) between UI objects and shadows at various depths.

Figure 8A:
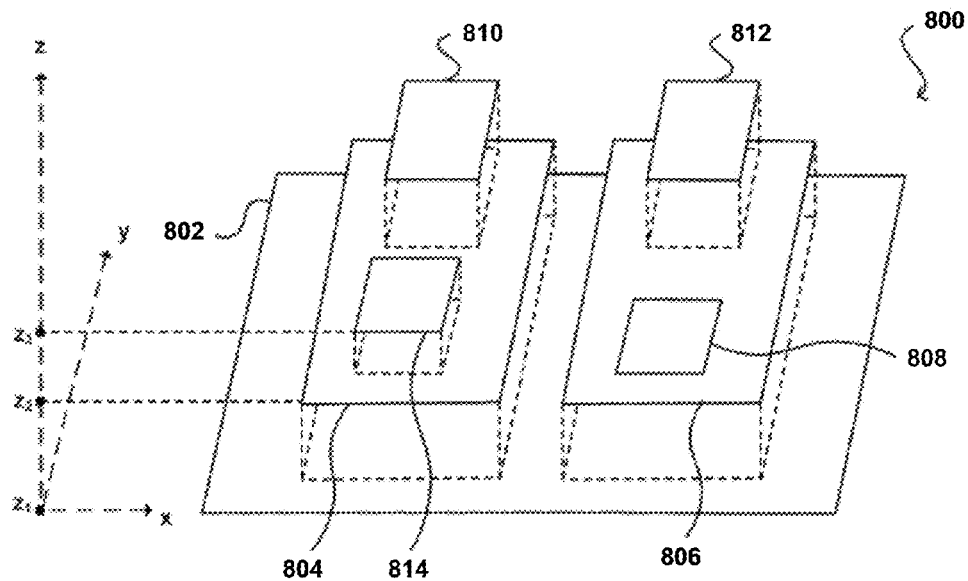
FIGS. 8A-8E illustrate an example user interface that simulates depth in accordance with an embodiment.

FIG. 8A illustrates an example 800 of a user interface displayed based upon a first viewing angle of a user in accordance with an embodiment. The example UI includes multiple user interface objects arranged at various depths. In particular, the UI objects are arranged according to three different depths, $z_0$, $z_1$, and $z_2$. At the lowest depth $z_0$ or the depth appearing to be furthest away from a user (and/or the display screen) is UI object 802. At the intermediate depth $z_1$ are UI objects 804, 806, and 808. UI object 808 is contained within UI object 806. At the highest depth $z_2$ or the depth appearing to be closest to a user (and/or the display screen) are UI objects 810, 812, and 814. In this example, UI objects 804 and 806 can be thought of as the "children" of UI object 802, UI objects 810 and 814 can be characterized as the children of UI object 804, and UI objects 808 and 812 are the children of UI object 806. UI objects 808, 810, 812, and 814 can be thought of as the "grandchildren" of UI object 802. Thus, UI objects 802, 804, 806, 808, 810, 812, and 814 can be represented as a UI hierarchy with UI object 802 as a root of the hierarchy, UI objects 804 and 806 as branches of the root, and UI objects 808, 810, 812, and 814 as leaves of the hierarchy, with UI objects 810 and 814 branching from UI object 804 and UI objects 808 and 812 branching from UI object 806. It will be appreciated by those of ordinary skill in the art that a user interface could have fewer or greater depths and/or fewer or greater UI objects than are illustrated in FIG. 8A. Thus, the depiction of the user interface 800 in FIG. 8A should be taken as being illustrative in nature and not limiting to the scope of the disclosure.

In various embodiments, each of the UI objects can be associated with presentation information such as a position and dimensions, including for example, x, y, and z coordinates defining an origin and a width and height for a planar UI object, x, y, and z coordinates defining the origin and a width, height, and depth for a rectangular cuboid UI object, or x, y, and z coordinates of vertices of a complex 3D UI object. It will be appreciated that UI objects can be represented as other primitive 2D or 3D geometric shapes, such as circles, triangles, polygons, spheres, pyramids, prisms, among others, or custom shapes defined by their vertices in other embodiments. The position and dimensions of each UI object can be used by a computing device to measure, layout, and/or draw the UI object based on the position of the face or head or user with respect to the computing device and/or the motion/orientation of the device to give the user an impression that he is interacting with the UI object in an environment having 3D depth. In addition, the position and dimensions of the UI object can be used to cast shadows based on an intersection of light from a virtual light source with the UI object to further enhance simulated 3D depth.

Figure 8B:
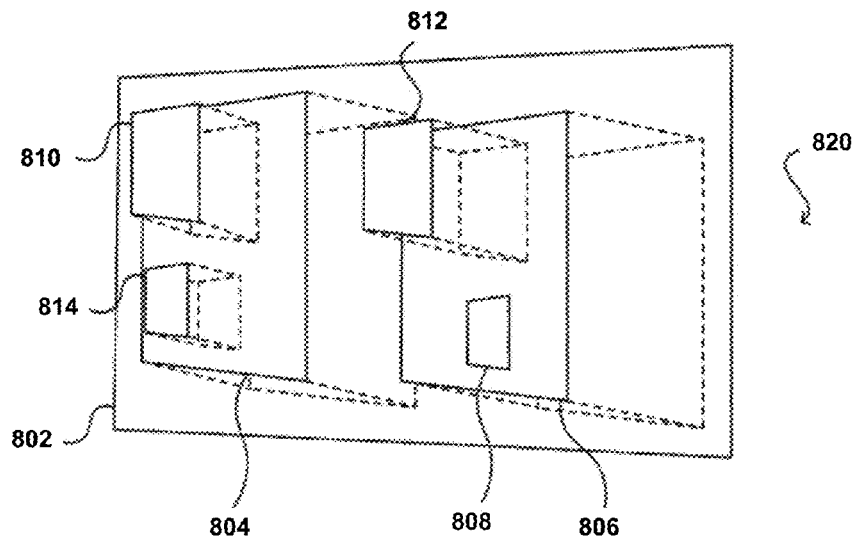

FIG. 8B illustrates an example 820 of the user interface at a second viewing angle of the user. In this example, the user has rotated the computing device laterally to the left (e.g., leftward along the y-axis). Such user interaction or input event may be monitored via an "event listener" associated with one or more of the UI objects. Upon detection of the input event, a callback function of the event listener may be invoked to cause the UI hierarchy to be redrawn or rendered to correspond to a new viewing angle of the user. In this example, UI objects 802, 804, 806, 808, 810, 812, and 814 can each be transformed according to a rotation, scale, translation, perspective projection, among other possibilities, based on the new viewing angle of the user so as to give the appearance that the UI objects exist in an environment having 3D depth. This can be demonstrated by the transformation of UI object 812, which can now be seen partially obscuring a portion of UI object 802 beneath UI object 804 which had not previously been obscured.

Figure 8C:
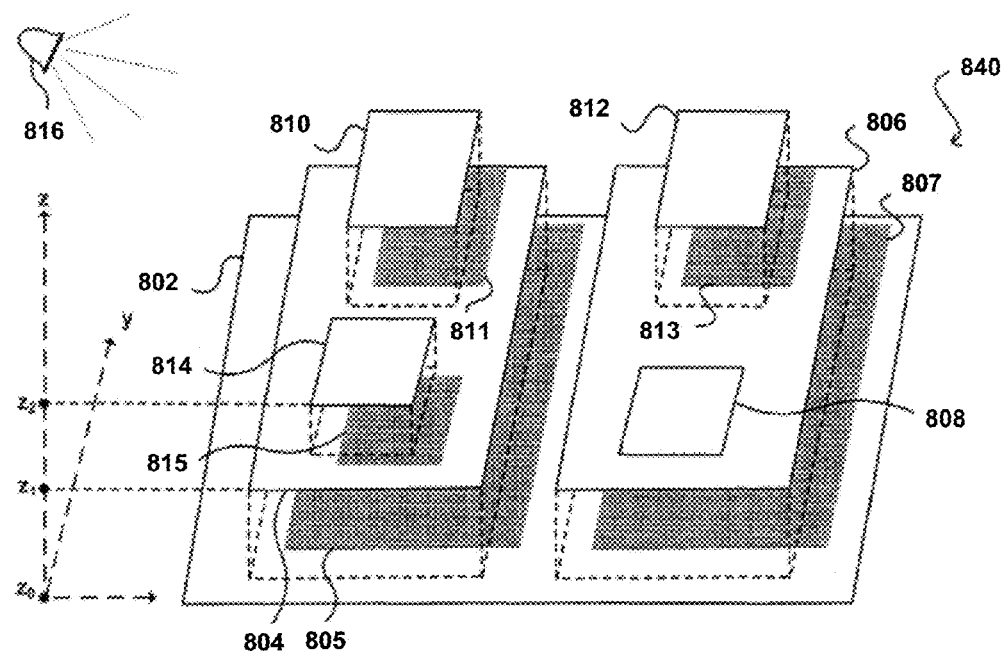

As mentioned, to further enhance an impression that a UI environment is associated with 3D depth, one or more UI objects can each be configured to cast a shadow based on the position and dimensions of the UI object, the properties of a virtual light source, and the position and dimensions of other UI objects upon which the shadow may be cast. FIG. 8C illustrates an example 840 of the user interface in which multiple UI objects have been configured to receive and/or cast shadows in accordance with an embodiment. In this example, a virtual light source 816 may be located off-screen at the upper left corner of a display screen presenting the UI. At the highest depth $z_3$, UI objects 810 and 814 each cast a shadow 811 and 815, respectively, on their parent, UI object 804. Further, UI object 812 casts a shadow 813 on its parent, UI object 806. At the intermediate depth $z_2$, UI object 808 does not cast a shadow on its parent because it is positioned flush (e.g., at the same depth) with respect to its parent, UI object 806. UI objects 804 and 806, however, each cast a shadow 805 and 807, respectively, on their parent, UI object 802. In this example, UI objects 802, 804, and 806 are shadow receivers as shadows are casted upon them by their children. UI objects 804, 806, 810, 812, and 814 are shadow casters as they cast shadows upon their parents. As can be seen with UI objects 804 and 806, a UI object can be both a shadow caster and a shadow receiver.

Figure 8D:
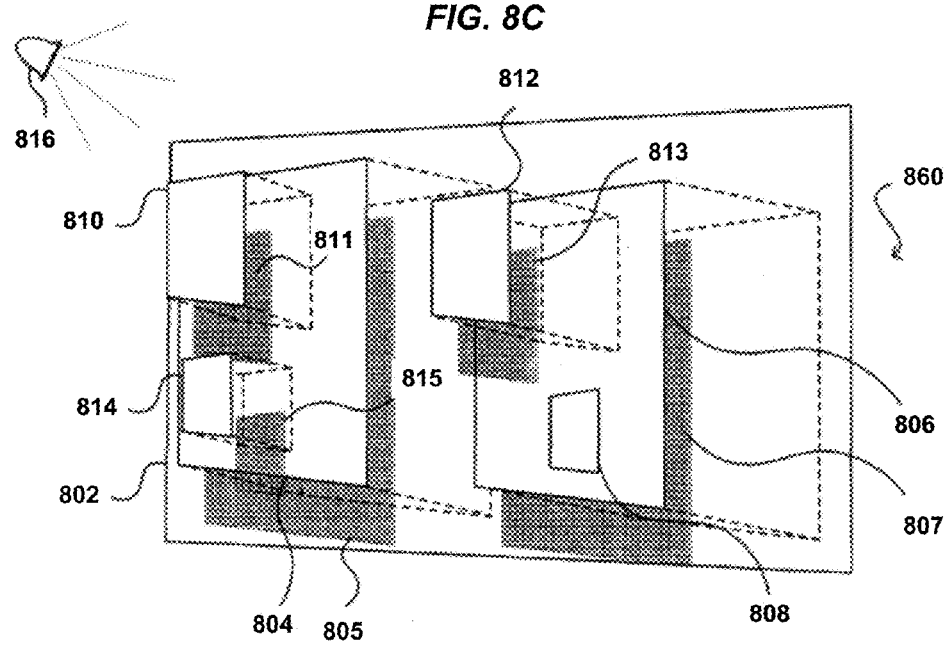

As the position of the user relative to the device and/or the motion/orientation of the device changes, transformations (e.g., rotation, scale, translation, perspective projection, etc.) can be applied to the UI objects to account for the new viewing angle of the user with respect to the device. Further, shadows can be redrawn or rendered according to the transformations of the UI objects and the properties of the virtual light source. FIG. 8D illustrates an example 860 of the user interface wherein the UI objects have been transformed based upon the new viewing angle of the user and shadows have been recast according to the dimensions of the transformed UI objects and the properties of the virtual light source. In this example, as the UI objects 802, 804, 806, 808, 810, 812, and 814 are transformed based upon the new viewing angle of the user, the respective shadows for shadow casting UI objects 804, 806, 810, 812, and 814 can also be redrawn or rendered to conform to the transformations of these objects' parents and/or the position and other characteristics of the virtual light source. The ability to recast shadows in a realistic manner can enhance the user's interactions with a user interface such as by providing cues as to how the user's behavior may affect the operation of a computing device.

Figure 8E:
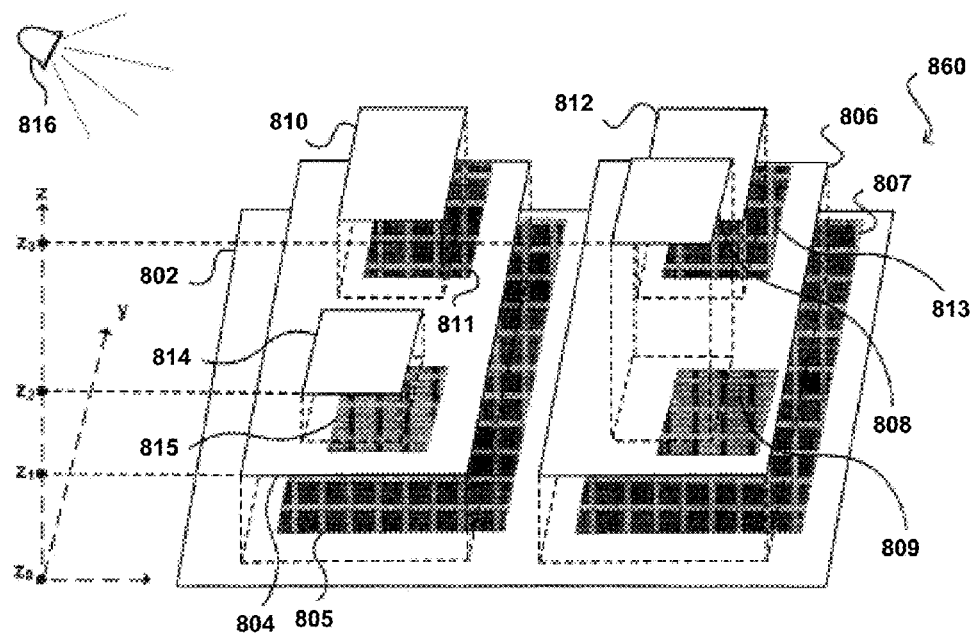

FIG. 8E illustrates an example 880 of the user interface in which the depth of UI object 808 changes as a result of a user interacting with the UI or the UI otherwise receiving another input to change the state of the UI object. For example, the UI may be a product catalog displaying product information in a grid layout. UI object 808, as seen in FIG. 8A, may have initially been de-emphasized because there was no inventory for the product associated with UI object 808. In FIG. 8E, the inventory for the product associated with UI object 808 may be replenished. Further, there may be a sale for the product such that the depth of UI object 808 is elevated from depth $z_1$ to a new depth $z_3$. As mentioned, when there is a new 3D depth established within a UI framework, the UI framework may update state information with the new depth and the dimensions of the UI object positioned at the new depth. In this example, UI object 808 did not previously cast a shadow. However, in other situations where the depth of a UI object has changed and the UI object previously cast shadows, it will be appreciated that the previous shadows can be updated or removed based on the new depth of the UI object. Further, if the UI object previously received shadows, these shadows can also be updated or removed. After the shadows cast or received by the UI object have been updated or removed, the shadows cast and received by the UI object at the new depth can be determined. Here, as a result in the change in the depth of UI object 808, the UI object can be seen casting a shadow 809 on parent UI object. In this example, shadow 809 is offset further to the right than shadows 811, 813, and 815 because its corresponding shadow-caster, UI object 808, is positioned at a higher depth than the corresponding shadow-casters for shadows 811, 813, and 815, UI object 810, 812, and 814, respectively. In other embodiments, the angle of the shadows, intensity, among other parameters, can be used to convey relative depth information.

The computational requirements of interfaces such as those described above with reference to FIGS. 6A-8E push the boundaries of what many devices are capable. It will therefore be appreciated that animation curve reduction techniques as described herein may support the implementation of such interfaces in that they may be leveraged to reduce the storage and processing requirements associated with the rendering and display of the UI objects in such interfaces.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   receiving animation data representing a three-dimensional (3D) animation including a 3D user interface object having a plurality of animation curves associated therewith representing behavior of the 3D user interface object in the 3D animation, each of the animation curves corresponding to an attribute of the 3D user interface object, each of the animation curves representing how the corresponding attribute changes over time; and
   for each of the animation curves:
      sampling the animation curve to generate a sequence of animation curve samples, each of the animation curve samples having a corresponding sample value;
      selecting a selected animation curve sample from the sequence of animation curve samples;
      comparing the sample value of the selected animation curve sample to an interpolation value derived from the sample value of a preceding animation curve sample and the sample value of a subsequent animation curve sample, the preceding animation curve sample preceding the selected animation curve sample in the sequence, and the subsequent animation curve sample following the selected animation curve sample in the sequence; and
      where the sample value of the selected animation curve sample differs from the interpolation value by less than a threshold amount, deleting the selected animation curve sample;
      wherein the threshold amount is used for at least one additional animation curve sample selected from the sequence of animation curve samples;

wherein the threshold amount is independently specified for different subsets of the animation curves, the threshold amount for a first animation curve being based on a relationship between a unit of a first attribute of the 3D user interface object to which the first animation curve corresponds and a unit of a display parameter of a mobile handheld device, and wherein the display parameter relates to a spatial resolution of the display or a color resolution of the display.

2. The method of claim 1, further comprising:
receiving the animation data from a 3D animation authoring tool on a remote device; and
transmitting the animation data to the mobile handheld device for rendering on the display in a manner that is responsive to input to the mobile handheld device.

3. The method of claim 1, further comprising deriving the interpolation value by averaging the sample value of the preceding one of the animation curve samples and the sample value of the subsequent one of the animation curve samples.

4. A computer-implemented method, comprising:
for an animation curve of a plurality of animation curves:
selecting a selected animation curve sample from a sequence of animation curve samples of the animation curve, each of the animation curve samples having a corresponding sample value;
comparing the sample value of the selected animation curve sample to an interpolation value derived from the sample value of a preceding animation curve sample and the sample value of a subsequent animation curve sample, the preceding animation curve sample preceding the selected animation curve sample in the sequence, and the subsequent animation curve sample following the selected animation curve sample in the sequence; and
where the sample value of the selected animation curve sample differs from the interpolation value by less than a threshold amount, deleting the selected animation curve sample;
wherein the animation curve represents a corresponding attribute of a user interface object, wherein the threshold amount is independently specified for the animation curve based on a relationship between a unit of the attribute to which the animation curve corresponds and a unit of a display parameter of a target device, and wherein the threshold amount is used for at least one additional animation curve sample selected from the sequence of animation curve samples.

5. The method of claim 4, further comprising receiving animation data representing an animation including the user interface object as one of a plurality of user interface objects.

6. The method of claim 5, wherein the animation data are received from an animation authoring tool on a remote device, and wherein the method further comprises transmitting the animation data to the target device for rendering on the display in a manner that is responsive to input to the target device.

7. The method of claim 5, further comprising, for animation curve sets for each of the plurality of user interface objects, repeating the selecting, comparing, and deleting.

8. The method of claim 4, further comprising sampling the animation curve to generate the sequence of animation curve samples.

9. The method of claim 8, wherein the animation curve is sampled at a sampling rate that is greater than or equal to a frame rate associated with the display of the target device.

10. The method of claim 4, wherein the attribute represented by the animation curve comprises one of translation of the user interface object in one of a plurality of translation axes, rotation of the user interface object in one of a plurality of scaling axes.

11. The method of claim 4, wherein the display parameter of the target device relates to a spatial resolution of the display or a color resolution of the display.

12. The method of claim 4, wherein the threshold amount for the animation curve is specified based on the attribute of the user interface object to which the animation curve corresponds.

13. The method of claim 4, wherein the attribute represented by the animation curve represents one or more of translation or rotation of the user interface object in one or more of a plurality of dimensions, and wherein the threshold amount for the animation curve is specified based on at least one of a pixel size of the display, a pixel density of the display, or a spatial resolution of the display.

14. The method of claim 4, wherein the attribute represented by the animation curve represents one or more of color, brightness, or shading of the user interface object, and wherein the threshold amount for the animation curve is specified based on a color or grayscale resolution of the display.

15. A computing system, comprising:
one or more memories having stored therein an animation curve of a plurality of animation curves, the animation curve representing a corresponding attribute of a user interface object; and
one or more processors configured to:
select a selected animation curve sample from a sequence of animation curve samples of the animation curve, each of the animation curve samples having a corresponding sample value;
compare the sample value of the selected animation curve sample to an interpolation value derived from the sample value of a preceding animation curve sample and the sample value of a subsequent animation curve sample, the preceding animation curve sample preceding the selected animation curve sample in the sequence, and the subsequent animation curve sample following the selected animation curve sample in the sequence; and
where the sample value of the selected animation curve sample differs from the interpolation value by less than a threshold amount, delete the selected animation curve sample;
wherein the threshold amount is independently specified for the animation curve based on a relationship between a unit of the attribute to which the animation curve corresponds and a unit of a display parameter of a target device, and wherein the threshold amount is used for at least one additional animation curve sample selected from the sequence of animation curve samples.

16. The computing system of claim 15, wherein the user interface object is one of a plurality of interface objects, and wherein the one or more memories have animation data stored therein representing an animation including the plurality of user interface objects.

17. The computing system of claim 16, wherein the animation data are received from an animation authoring tool on a remote device, and wherein the one or more processors are further configured to transmit the animation data to the target device for rendering on the display in a manner that is responsive to input to the target device.

18. The computing system of claim 16, wherein the one or more processors are further configured to, for animation curve sets each of the user interface objects, repeat the selecting, comparing, and deleting.

19. The computing system of claim 15, wherein the one or more processors are further configured to sample the animation curve to generate the sequence of animation curve samples.

20. The computing system of claim 19, wherein the one or more processors are configured to sample the animation curve at a sampling rate that is greater than or equal to a frame rate associated with the display of the target device.

21. The computing system of claim 15, wherein the attribute of the user interface object represented by the animation curve comprises one of translation of the user interface object in one of a plurality of translation axes, rotation of the user interface object in one of a plurality of rotation axes, or scaling of the user interface object in one of a plurality of scaling axes.

22. The computing system of claim 15, wherein the display parameter of the target device relates to a spatial resolution of the display or a color resolution of the display.

23. The computing system of claim 15, wherein the threshold amount for the animation curve is specified based on the attribute of the user interface object to which the animation curve corresponds.

24. The computing system of claim 15, wherein the attribute represented by the animation curve represents one or more of translation or rotation of the user interface object in one or more of a plurality of dimensions, and wherein the threshold amount for the animation curve is specified based on at least one of a pixel size of the display, a pixel density of the display, or a spatial resolution of the display.

25. The computing system of claim 15, wherein the attribute represented by the animation curve represents one or more of color, brightness, or shading of the user interface object, and wherein the threshold amount for the animation curve is specified based on a color or grayscale resolution of the display.

\* \* \* \* \*